United States Patent [19]

Hoppal

[11] Patent Number: 5,687,059
[45] Date of Patent: Nov. 11, 1997

[54] MASS STORAGE DEVICE MOUNTING SCHEME

[75] Inventor: John P. Hoppal, Fort Collins, Colo.

[73] Assignee: Hewlett-Packard Co, Palo Alto, Calif.

[21] Appl. No.: 746,050

[22] Filed: Nov. 6, 1996

Related U.S. Application Data

[63] Continuation of Ser. No. 302,137, Sep. 7, 1994, abandoned.

[51] Int. Cl.$^6$ .............................. G06F 1/16; H05K 7/14
[52] U.S. Cl. ............................................. 361/685; 361/724
[58] Field of Search ........................................ 361/683, 685, 361/724, 725; 360/137 D; 206/305, 320, 328; 248/560, 632, 634, 636, 672, 674

[56] References Cited

U.S. PATENT DOCUMENTS

| | | | |
|---|---|---|---|
| 4,964,017 | 10/1990 | Jindrick et al. | 361/685 |
| 5,004,207 | 4/1991 | Ishikawa et al. | 248/632 |
| 5,111,975 | 5/1992 | Roberts | 222/475.1 |
| 5,161,770 | 11/1992 | Morehouse et al. | 248/632 |
| 5,195,022 | 3/1993 | Hoppal et al. | 361/391 |
| 5,207,342 | 5/1993 | Tsuji et al. | 220/4.02 |
| 5,224,024 | 6/1993 | Tu et al. | 361/685 |
| 5,306,079 | 4/1994 | Liu | 361/685 |
| 5,313,099 | 5/1994 | Tata et al. | 257/717 |
| 5,333,098 | 7/1994 | DeLuca et al. | 361/685 |

FOREIGN PATENT DOCUMENTS

| | | | |
|---|---|---|---|
| 0508033 | 10/1992 | European Pat. Off. | 361/679 |
| 0546211A1 | 6/1993 | European Pat. Off. | H05K 7/14 |
| 0201975 | 8/1988 | Japan | 360/137 |
| 94/19594 | 9/1994 | WIPO | F02F 7/00 |

OTHER PUBLICATIONS

"HP-PAC: A New Chassis and Housing Concept for Electronic Equipment", Hewlett Packard Journal, Aug. 1994, vol. 45, pp. 23-28.

*Primary Examiner*—Leo P. Picard
*Assistant Examiner*—Lynn D. Field
*Attorney, Agent, or Firm*—Cynthia S. Baan

[57] ABSTRACT

A molded, expanded polypropylene mass storage mounting scheme that snugly nests a disk mechanism between a bottom part of the mounting scheme housing and a top part of the mounting scheme housing. The mass storage device mounting scheme housing has holes or depressions that are formed to snugly correspond to protruding details in the bottom cover of a computer or workstation assembly enclosure. The mounting holes and protruding details permit the mass storage mounting scheme to be smaller than the entire inside of the computer assembly and still be held securely against horizontal and rotational movement. The top and bottom covers of the computer compressively secures the mass storage device mounting scheme against vertical movement.

18 Claims, 7 Drawing Sheets

5,687,059

MASS STORAGE DEVICE MOUNTING SCHEME

This is a continuation of application Ser. No. 08/302,137 filed on Sep. 7, 1994, now abandoned.

FIELD OF THE INVENTION

The present invention relates generally to the field of computer or workstation electronic assemblies and more particularly to the mounting and arrangement of storage devices inside a computer or workstation electronic assembly enclosure. In particular, this invention provides an apparatus and method for mounting hard disk drives, floppy disk drives, DAT drives, and CD-ROM devices inside and electronic assembly enclosure.

BACKGROUND OF THE INVENTION

The current trend in computer and workstation electronic assemblies is to decrease the size, weight, and cost of the assemblies while increasing their overall performance. One of the elements adding to the overall weight and cost of computers and workstations is the manner in which storage devices are mounted and secured against vibration and shock inside the electronic assembly. For example, disk mechanisms are typically mounted onto sheet metal or plastic brackets using screws, rivets or other mounting hardware. The resulting sub-assembly is then mounted to the main chassis of the electronic assembly via more mounting hardware. Such a mounting scheme requires numerous hardware parts and is time consuming to assemble, replace or repair. Such a mounting scheme is generally not very intuitive for assembly/disassembly purposes. Also, many tools, and sometimes specialized tools are required for assembly and disassembly, which can also be costly to an end user wishing to repair or replace a disk mechanism after purchase.

One prior solution has been to mount the disk mechanisms to plastic brackets using screws, rivets or other mounting hardware. This sub-assembly is then snapped into details in the main chassis of the electronic assembly. Although this procedure may eliminate some heavy metal components, it still requires numerous hardware parts and is still time consuming to assemble, replace or repair. Moreover, this solution may also require specially designed tools and is not very intuitive with respects to assembly/disassembly by an end user.

Accordingly, there is need in the field of computer and workstation electronic assemblies for a storage device mounting scheme that allows fast, easy, intuitive assembly, repair and replacement of the mass storage devices. Moreover, there is a need for a mass storage device mounting scheme that does not use heavy and expensive mounting hardware that requires time consuming assembly/disassembly with specially designed tools. Preferably, a solution would be cost effective, light weight, and shock absorbing.

SUMMARY OF THE INVENTION

It is an aspect of the present invention to provide an improved mass storage device mounting apparatus and method that overcomes the disadvantages of current and past storage device mounting schemes.

The above and other aspects of the present invention are accomplished in a molded, expanded polypropylene mass storage device mounting scheme that snugly nests a disk mechanism between a bottom part of the mounting scheme housing and a top part of the mounting scheme housing. The mass storage device mounting scheme housing has holes or depressions that are formed to correspond to protruding details in the bottom cover of a computer or workstation assembly enclosure.

BRIEF DESCRIPTION OF THE DRAWINGS

The above and other objects, features and advantages of the present invention will be better understood by reading the following more particular description of the invention, presented in conjunction with the following drawings, wherein.

DETAILED DESCRIPTION OF THE PREFERRED EMBODIMENT

Figure 1:
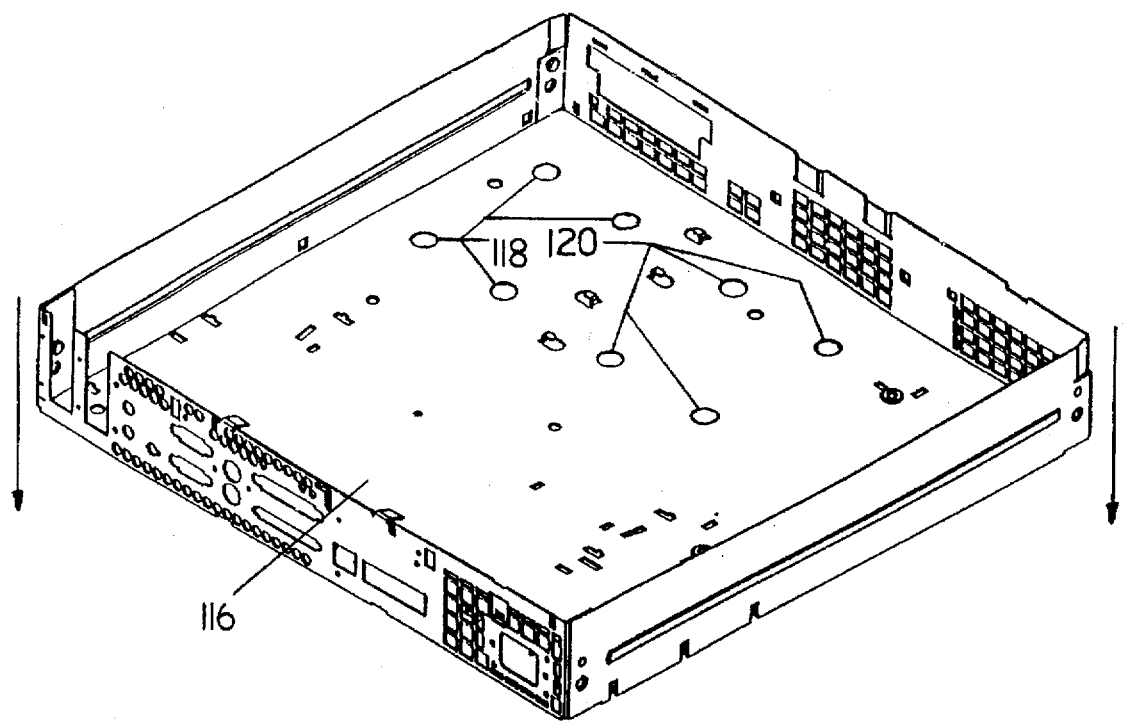
FIGS. 1–7 show the assembly process for a mass storage device mounting scheme within a computer or workstation assembly enclosure.
Figure 1:
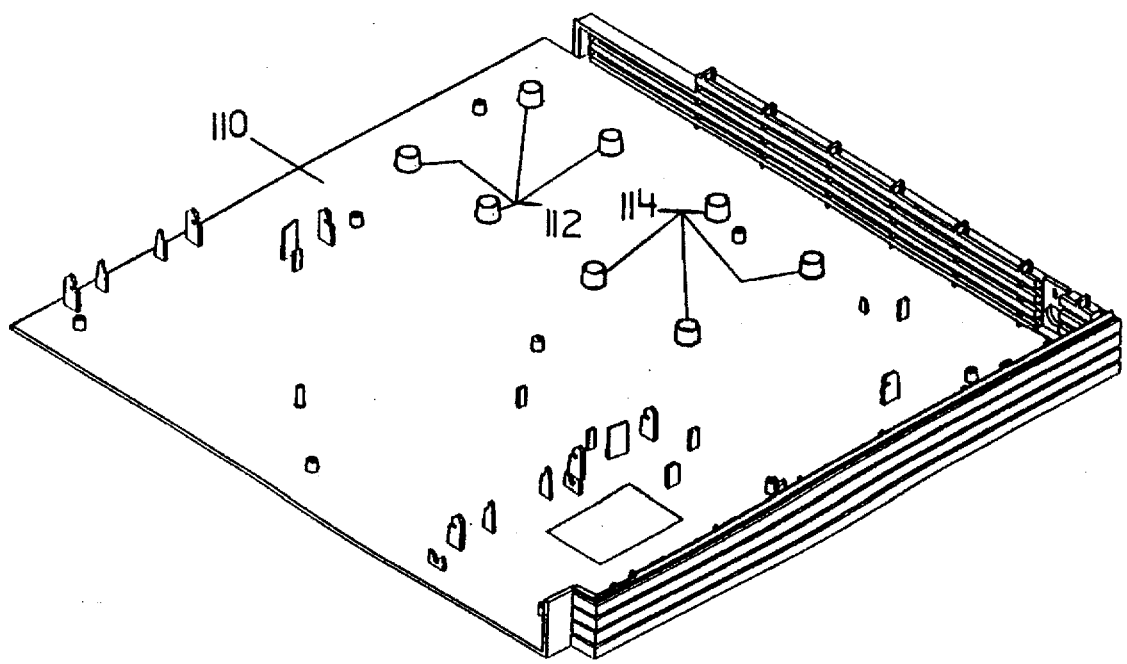
Figure 2:
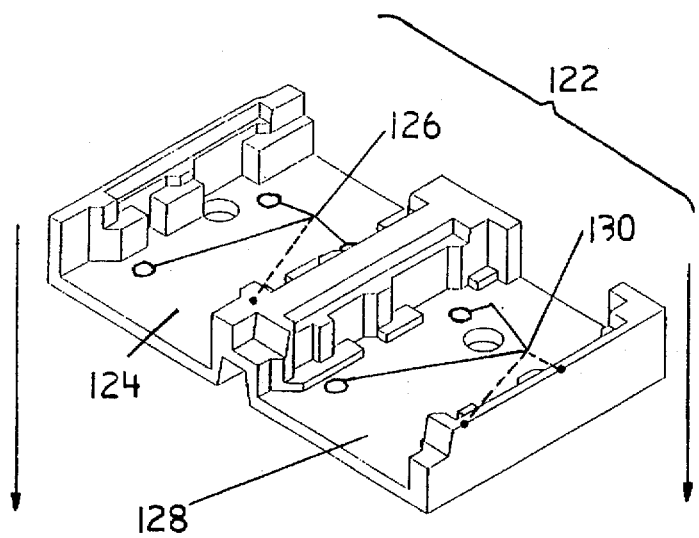
Figure 2:
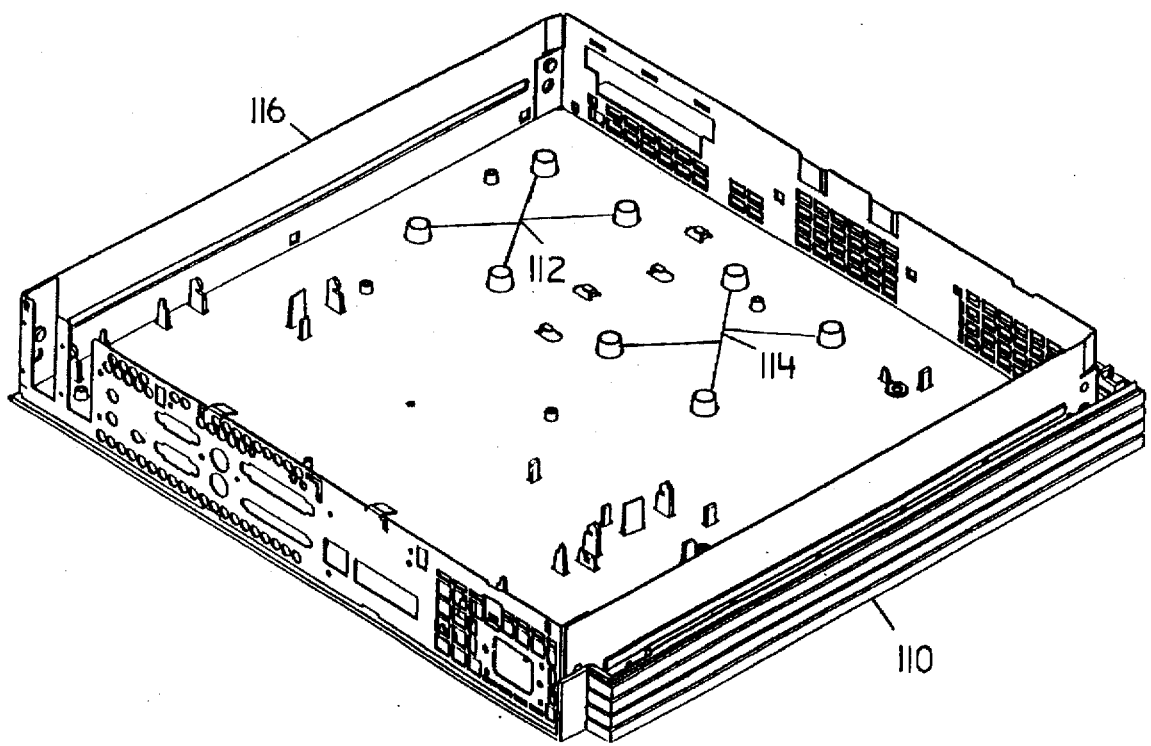

FIG. 1 shows a plastic injection molded, cosmetic bottom cover 110 which includes protruding details 112 and protruding details 114. Although bottom cover 110 is plastic, it could also be sheet metal or other like material. Also, details 112 and 114 could be in various shapes, sizes and locations. A sheet metal chassis 116, which contains punched or cut out details 118 and 120 that correspond in size, shape and location with protruding details 112 and 114 respectively, is then inserted into bottom cover 110 such that protruding details 112 and 114 of bottom cover 110 matingly extend through punched out details 118 and 120 respectively into the interior of the chassis 116, (see FIG. 2). The bottom cover 110 and the chassis 116 are then heat staked together. It should be noted that bottom cover 110 and support chassis 116 could be one integral component of plastic, metal or other similar material. Referring now to FIG. 2, disk drive bracket bottom 122 is shown which includes floppy disk drive bottom bracket 124 and hard disk drive bottom bracket 128. Floppy disk drive bottom bracket 124 includes holes 126 that mating correspond with protruding details 112 in size, shape and location. Hard disk drive bottom bracket 128 includes holes 130 that mating correspond with protruding details 114 in size, shape and location. To assemble, disk drive bracket bottom 122 is lowered into the previous sub-assembly (see FIG. 3) until protruding details 112 and 114 mate with holes 126 and 130, respectively, such that disk drive bracket bottom 122 is secured against movement side-to-side, front-to-back and downward. It should be noted that bracket bottom 122 covers only a portion of the chassis 116, but is secured against movement by the mating of holes 126 and 130 to details 112 and 114.

Disk drive bracket bottom 122 is made of expanded polypropylene (EPP) by injecting polypropylene beads in a precombustion chamber at a pressure of approximately 5 bar which reduces the pellet volume. The beads are then injected into the mold at a pressure of approximately 4 bar until a particular filling ratio is reached. The pressure is then reduced to normal so that the beads can re-expand and fill the mold. Once the mold is filled, steam at 180 degrees Celsius is injected into the mold through nozzles, warming the surface of the beads and fusing them together. The part is then cooled, removed from the mold, and cured by subsequent temperature cycles. It should be understood that the disk drive bracket bottom 122 may also be made of polyurethane, polystyrene, plastic, aluminum or other metal or similar material.

Figure 3:
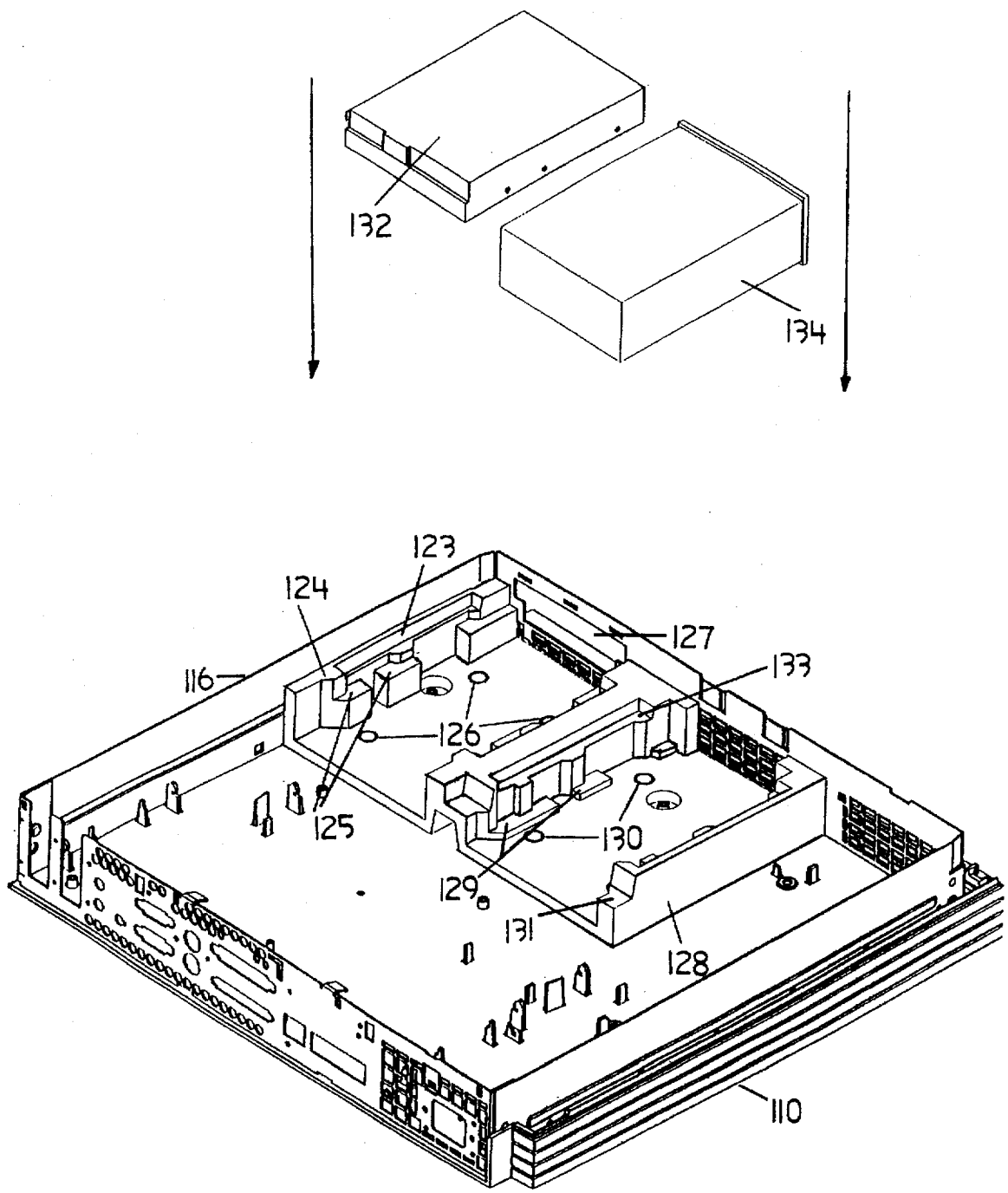

Referring now to FIG. 3, floppy disk drive 132 and hard disk drive 134 are shown. To assemble, floppy disk drive 132 is lowered into floppy disk drive bottom bracket 124 (see FIG. 4) until it rests on floppy disk drive support ledge 125 of bracket 124 and snugly fits within the internal form of bracket 124. The floppy disk access window (not shown) of floppy disk drive 132 is aligned with external floppy disk drive access window 127 of computer chassis 116. Hard disk drive 134 is lowered into hard disk drive bottom bracket 128 (see FIG. 4) until it rests on hard disk drive support ledge 129 of bracket 128 and snugly fits within the internal form of bracket 128. Floppy disk drive bottom bracket 124 and hard disk drive bottom bracket 128 can be any form as long as the internal pockets snugly secure floppy disk drive 132 and hard disk drive 134 from movement side-to-side, front-to-back, and downward, or stated differently against any horizontal or downward movement.

Figure 4:
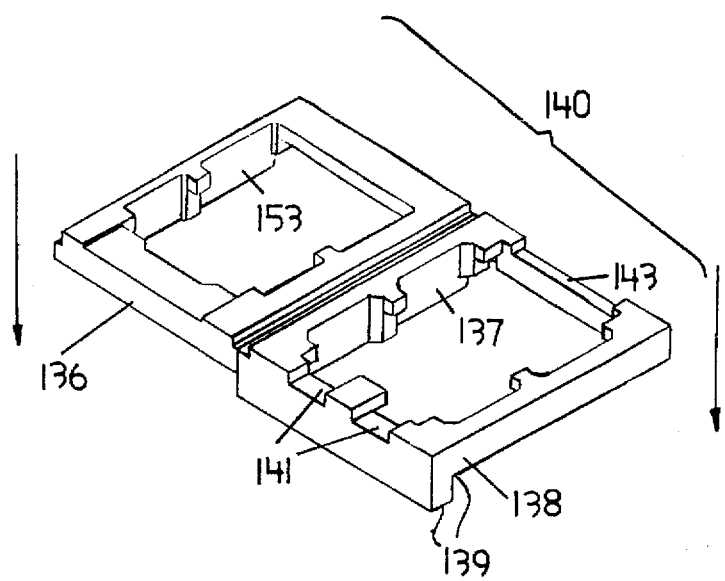
Figure 4:
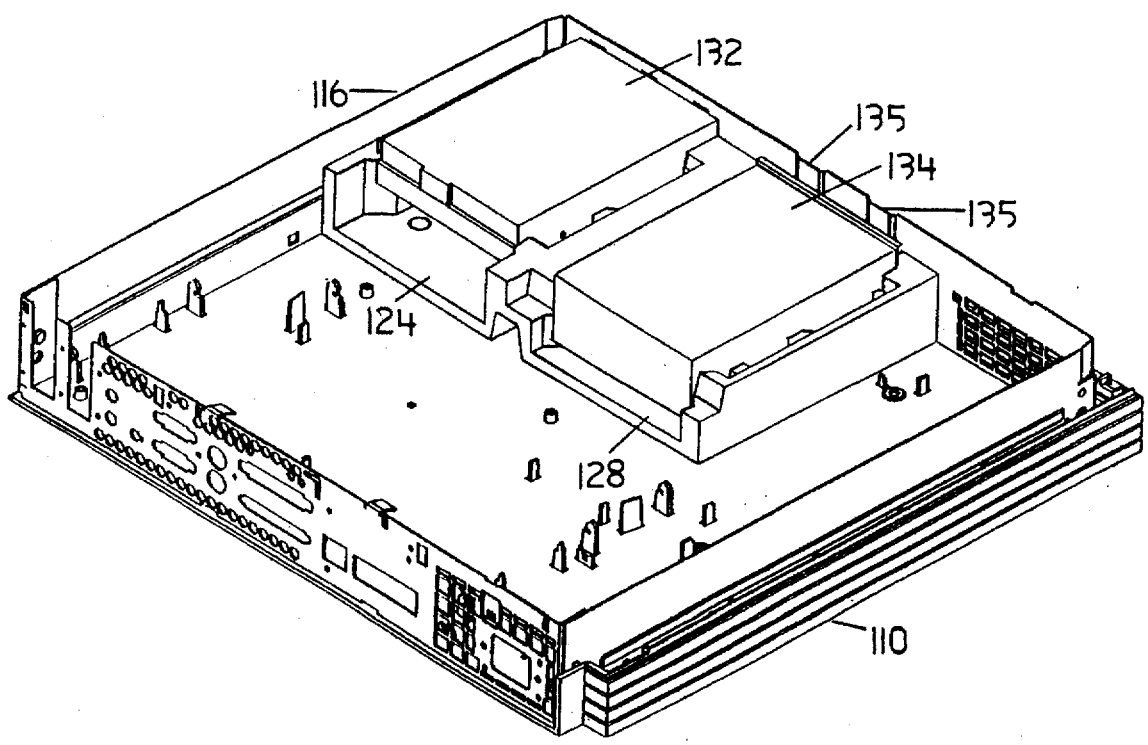

Referring now to FIG. 4, disk drive bracket cover 140 is shown which includes floppy disk drive bracket cover 136 and hard disk drive bracket cover 138. Floppy disk drive bracket cover 136 has an internal pocket form that corresponds to the outer shape of floppy disk drive 132 and molded details 153 that snugly nest with corresponding details 123 of floppy disk drive bracket bottom 124. Hard disk drive bracket cover 138 has an internal pocket form that corresponds to the outer shape of hard disk drive 134 and molded details 137 and 139 that snugly nest with corresponding details 133 and 131 of hard disk drive bracket bottom 128. To assemble, disk drive bracket cover 140 is lowered onto the previous sub-assembly (see FIG. 5) until the various details 153, 137 and 139 of disk drive bracket cover 140 snugly nest with the various details 123, 133 and 131 respectively of disk drive bracket bottom 122, such that disk drive bracket cover 140 is secured against movement side-to-side, front-to-back and downward. Disk drive bracket cover 140 prevents the floppy disk drive 132 and hard disk drive 134 from moving side-to-side, front-to-back, and upward movement (see FIGS. 5–6). Disk drive bracket cover 140 is made of expanded polypropylene (EPP) in a manner similar to that of disk drive bracket bottom 122, as stated above.

Figure 5:
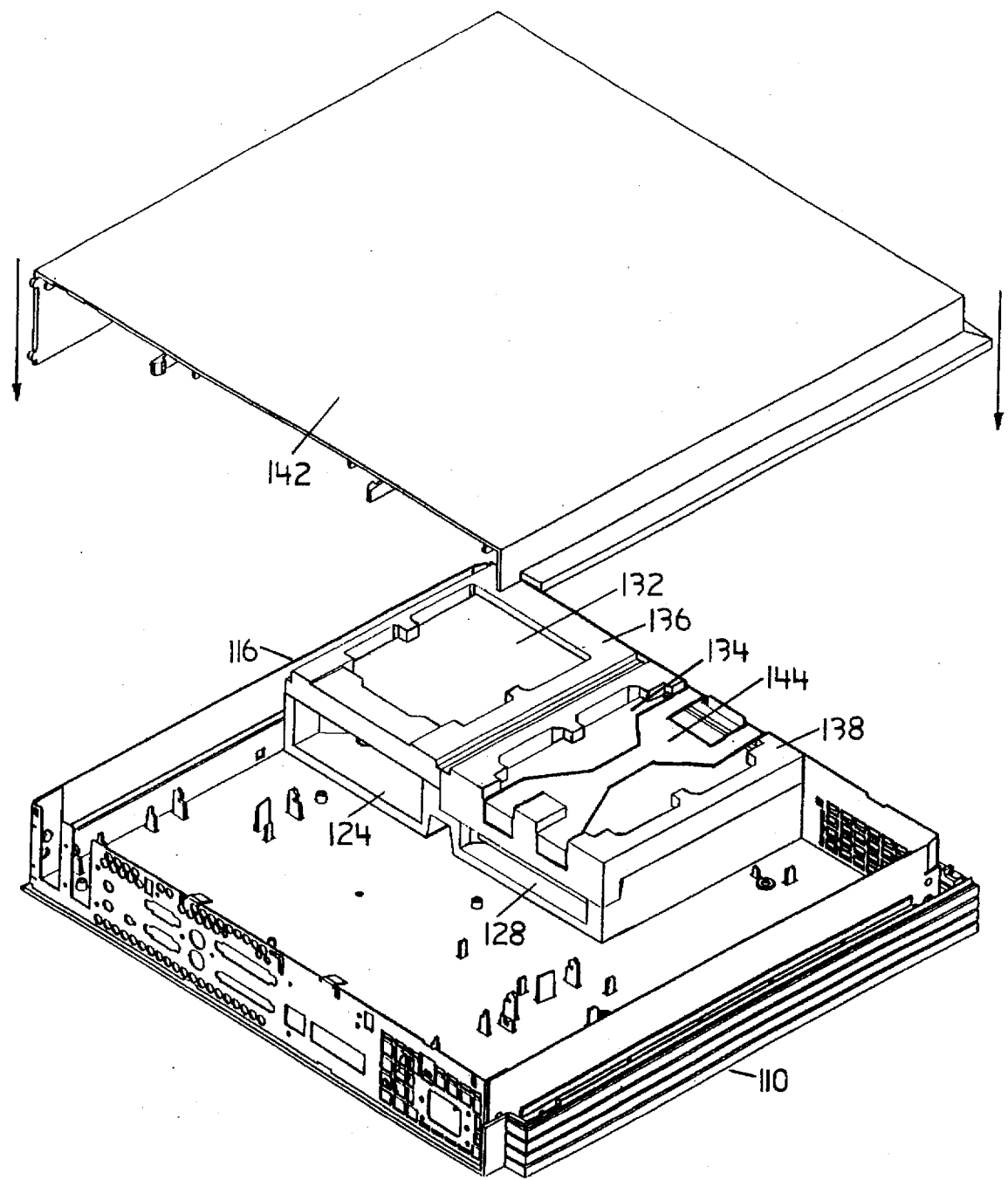
Figure 6:
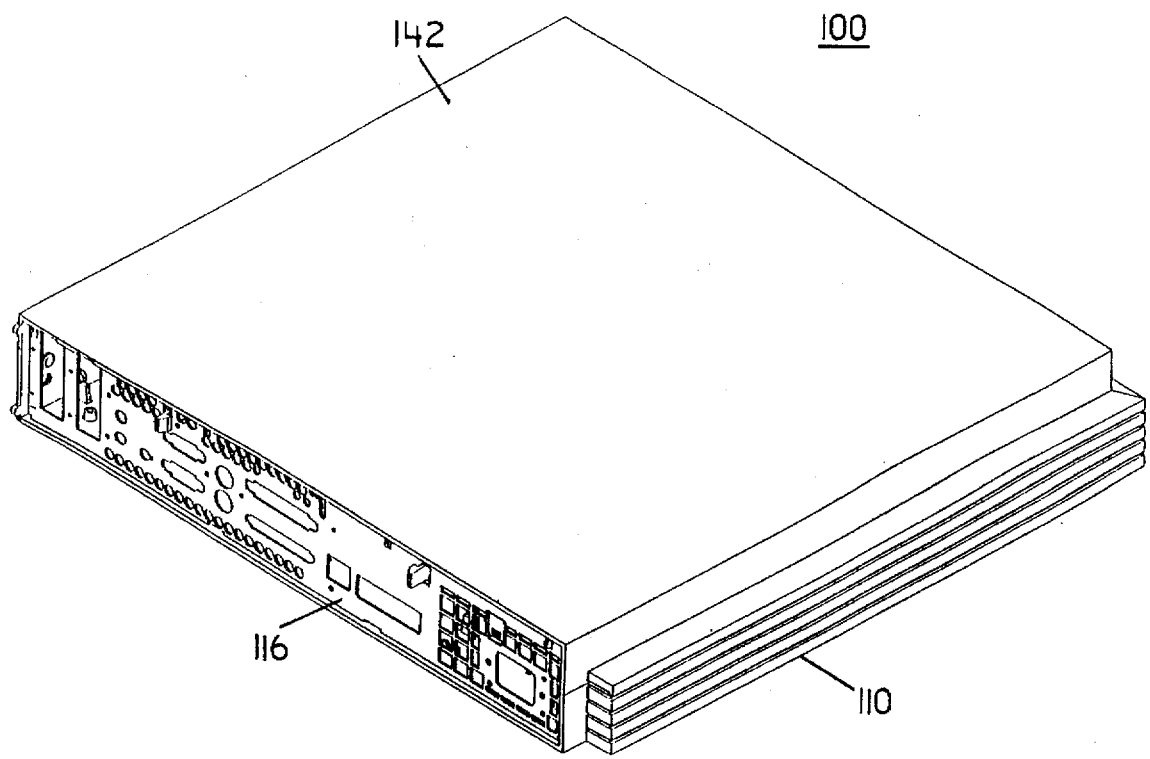

Referring now to FIGS. 5 and 6, a computer cover is shown which consists of a sheet metal liner (not shown) and a plastic injection molded cosmetic computer top cover 142. The computer cover can be made of other materials as is well known in the industry. To assemble, the cover 142 is lowered onto the sub-assembly and it either snap fits to the bottom cover 110 and metal chassis 116 or is secured to the bottom cover 110 and metal chassis 116 by screws, rivets or other now known or later developed means. Once cover 142 is secured to bottom cover 110 and metal chassis 116, the disk drive mounting assembly is secured against upward movement by the cover 142 being snug against the top surface of the mounting assembly.

Referring now to FIGS. 4 and 5, an optional clamp 144 is shown, which is made of sheet metal, plastic or other material of similar tensile strength. Clamp 144 is shaped like an "H" with four end members 146 being bent approximately 90 degrees in the same direction. End members 146 of clamp 144 fit over details 141 and 143 of bracket cover 140 and into details 135 of chassis 116. The inventor has found that polypropylene has good compression strength, but insufficient tensile strength to support the weight of most hard disk drives if the computer 100 sees severe shock impulses during shipment or during end use. A clamp similar to clamp 144 can be designed to secure any thin or weak sides of the mounting assembly against breakage during shipment or if the computer is stored on its side.

Figure 7:
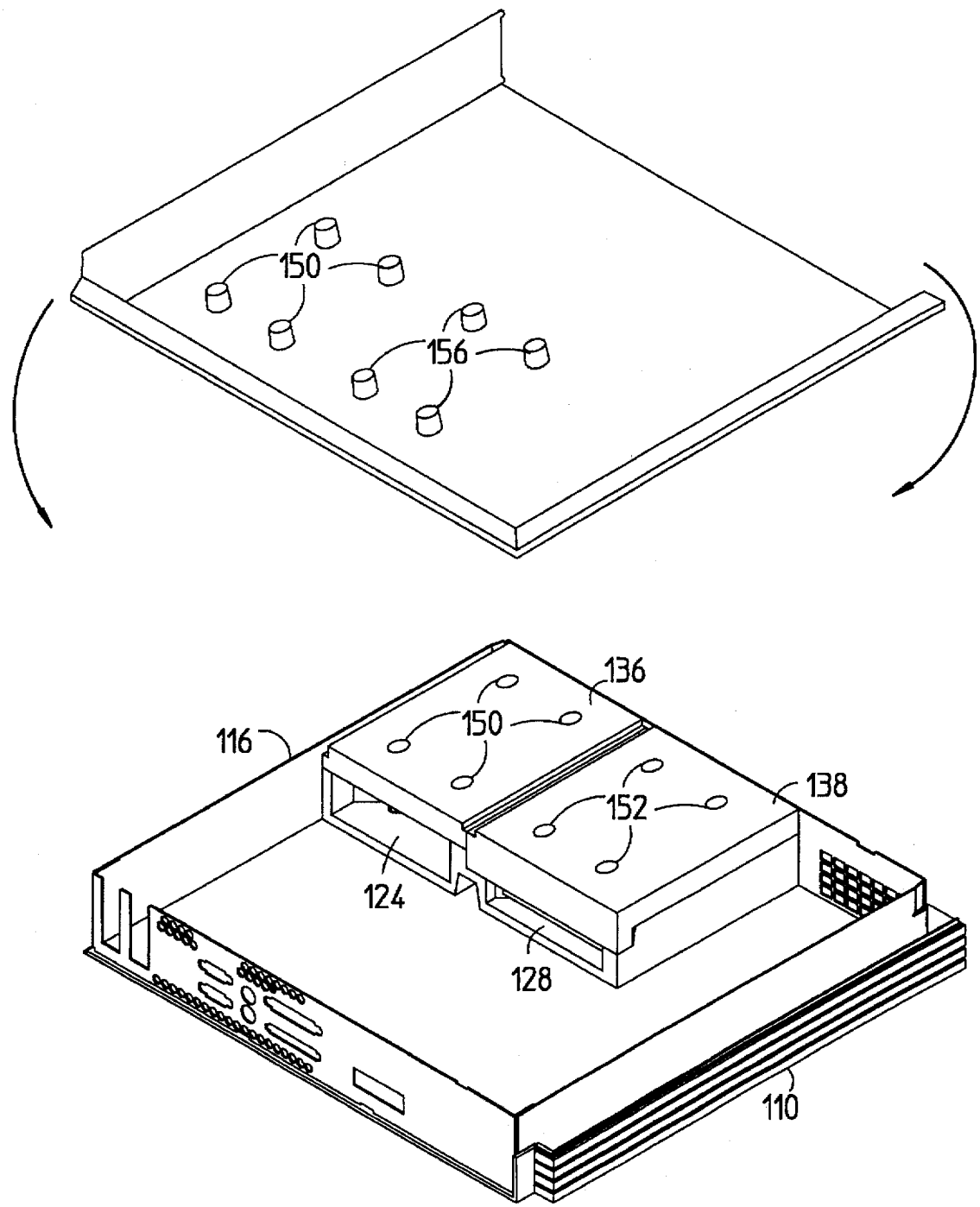

Another optional feature, as shown in FIG. 7, to further secure against side-to-side or forward-and-backward movement is to design the bracket cover 140 similar to the bracket bottom 122 with holes 150 and 152 similar to holes 126 and 130 that would correspond to protruding details 154 and 156 designed into cover 142 that are similar to protruding details 112 and 114 of computer bottom 110. Although such an option would add to the design and manufacturing cost, it would further secure the disk drive mounting assembly from side-to side and forward-and-backward movement. A support wall could also be incorporated into the top cover and would also probably do away with the need for clamp 144. It should again be noted that the mass storage device of the present invention does not fill the entire electronic chassis, yet is secured against movement inside the chassis by mating holes of the storage device mounting scheme to protruding details in the chassis, which can be either on the bottom of the chassis or on both the bottom and the top of the chassis.

The foregoing description of the present invention has been presented for purposes of illustration and description. It is not intended to be exhaustive or to limit the invention to the precise form disclosed, and other modifications and variations may be possible in light of the above teachings. For example, this nesting concept may be implemented with plastic and/or metal, rather than polypropylene without departing from the nature of the invention. Moreover, this invention could be used to secure any component against movement, vibration or shock within in almost any electronic assembly, such as sensitive components in a VCR or video game assembly. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A mass storage device mounting scheme comprising:
   an electronic chassis with at least one protruding detail on a bottom surface of said electronic chassis, said at least one protruding detail being substantially permanently attached to said electronic chassis;
   at least one storage device bracket bottom with at least one hole that matingly corresponds with said at least one substantially permanent protruding detail, said at least one storage device bracket bottom being mounted in said electronic chassis such that said at least one hole of said at least one storage device bracket bottom is mated with said at least one protruding detail of said electronic chassis, such that said at least one storage device bracket bottom is held in place relative to one plane of travel by said at least one substantially permanent protruding detail;
   at least one storage device snugly mounted in said at least one storage device bracket bottom;
   at least one storage device bracket cover snugly mounted over said at least one storage device; and
   an electronic chassis cover mounted to said electronic chassis such that said electronic chassis cover secures said at least one storage device against movement in a direction perpendicular to said one plane.

2. The mass storage device mounting scheme according to claim 1 wherein said at least one storage device bracket bottom and said at least one storage device bracket cover are made of expanded polypropylene.

3. The mass storage device mounting scheme according to claim 1 wherein said at least one storage device bracket bottom and said at least one storage device bracket cover snugly fit the outer contours of said at least one storage device.

4. The mass storage device mounting scheme according to claim 1 further comprising a clamp for securing said at least one storage device bracket cover to said electronic chassis.

5. The mass storage device according to claim 1 wherein said at least one storage device bracket cover has at least one hole and said electronic chassis cover has at least one substantially permanent protruding detail that matingly corresponds with said at least one hole of said at least one storage device bracket cover such that when said electronic chassis cover is mounted to said electronic chassis, said at least one storage device is further secured against movement in said one plane.

6. A mass storage device mounting scheme comprising:
an electronic chassis;
at least one storage device bracket bottom, said at least one storage device bracket bottom being mounted in said electronic chassis without any additional mounting hardware other than that which are substantially permanent features of said electronic chassis and said at least one storage device bracket bottom, said storage device bracket bottom being mounted in said electronic chassis in such a manner that said storage device bracket bottom is secured against movement in one plane of travel;
at least one storage device snugly mounted in said at least one storage device bracket bottom, said at least one storage device mounted in said at least one storage device bracket bottom without any additional mounting hardware;
at least one storage device bracket cover snugly mounted over said at least one storage device, said at least one storage device bracket cover mounted over said at least one storage device without any additional mounting hardware; and
an electronic chassis cover mounted to said electronic chassis such that said electronic chassis cover secures said at least one storage device against movement in a direction substantially perpendicular to said one plane.

7. The mass storage device mounting scheme according to claim 6 wherein said at least one storage device bracket bottom and said at least one storage device bracket cover are made of expanded polypropylene.

8. The mass storage device mounting scheme according to claim 6 wherein said at least one storage device bracket bottom and said at least one storage device bracket cover snugly fit the outer contours of said at least one storage device.

9. The mass storage device mounting scheme according to claim 6 further comprising a clamp for securing said at least one storage device bracket cover to said electronic chassis.

10. The mass storage device according to claim 6 wherein said at least one storage device bracket cover has at least one hole and said electronic chassis cover has at least one substantially permanent protruding detail that matingly corresponds with said at least one hole of said at least one storage device bracket cover such that when said electronic chassis cover is mounted to said electronic chassis, said at least one storage device is further secured against movement in said one plane.

11. A mass storage device mounting scheme comprising:
an electronic chassis with at least one protruding detail on a bottom surface of said electronic chassis;
at least one storage device bracket bottom with at least one hole that matingly corresponds with said at least one protruding detail, said at least one storage device bracket bottom being mounted in said electronic chassis such that said at least one hole of said at least one storage device bracket bottom is mated with said at least one protruding detail of said electronic chassis, said at least one storage device bracket bottom does not completely fill said electronic chassis;
at least one storage device bracket cover shaped in such a manner as to be snugly mounted over at least one storage device mounted in said at least one storage device bracket bottom, said at least one storage device bracket cover does not completely fill said electronic chassis; and
an electronic chassis cover mounted to said electronic chassis such that said electronic chassis cover secures said at least one storage device against upward movement.

12. The mass storage device mounting scheme according to claim 11 wherein said at least one storage device bracket bottom and said at least one storage device bracket cover are made of expanded polypropylene.

13. The mass storage device mounting scheme according to claim 11 wherein said at least one storage device bracket bottom and said at least one storage device bracket cover are designed to snugly fit the outer contours of said at least one storage device.

14. The mass storage device mounting scheme according to claim 11 further comprising a clamp for securing said at least one storage device bracket cover to said electronic chassis.

15. The mass storage device according to claim 11 wherein said at least one storage device bracket cover has at least one hole and said electronic chassis cover has at least one substantially permanent protruding detail that matingly corresponds with said at least one hole of said at least one storage device bracket cover such that when said electronic chassis cover is mounted to said electronic chassis, said at least one storage device is further secured against movement in said one plane.

16. A method of mounting a mass storage device in an electronic chassis, said method comprising the following steps:

(a) mating a storage device bracket bottom having at least one hole with said electronic chassis having at least one substantially permanent protruding detail that corresponds to said at least one hole in said storage device bracket bottom such that said at least one substantially permanent protruding detail is mated to said at least one hole, said storage device bracket bottom being mated with said electronic chassis without any additional mounting hardware;

b) mounting at least one storage device in said storage device bracket bottom without any additional mounting hardware;

(c) mating a storage device bracket cover to said at least one storage device and said storage device bracket bottom without any additional mounting hardware such that said storage device bracket bottom and said storage device bracket cover snugly conform to outer contours of said at least one storage device; and (d) securing an electronic chassis cover to said electronic chassis such that said electronic chassis cover secures said at least one storage device against upward movement.

17. The method of claim 16 comprising an additional step of securing said storage device bracket cover to said electronic chassis with a clamp.

18. A method of replacing a mass storage device in an electronic chassis, said method comprising the following steps:

(a) removing an electronic chassis cover from said electronic chassis;

(b) removing a storage device bracket cover without removing any mounting hardware other than said storage device bracket cover itself from a mug mated position with at least one storage device and a storage device bracket bottom;

(c) removing said at least one storage device from a snug mated position in said storage device bracket bottom without removing any mounting hardware;

(d) mounting at least one new storage device in said storage device bracket bottom without any mounting hardware other than the snug fit between the storage device and the storage device bracket bottom, said storage device bracket bottom being mounted in said electronic chassis by means of substantially permanent features of said electronic chassis and said storage device bottom without any additional mounting hardware;

(e) mating a storage device bracket cover to said at least one new storage device and said storage device bracket bottom such that said storage device bracket bottom and said storage device bracket cover snugly conform to outer contours of said at least one new storage device, said storage device bracket cover being mated to said at least one new storage device and said storage device bracket bottom without any additional mounting hardware; and (f) securing said electronic chassis cover to said electronic chassis such that said electronic chassis cover secures said at least one new storage device against upward movement.

\* \* \* \* \*

UNITED STATES PATENT AND TRADEMARK OFFICE
CERTIFICATE OF CORRECTION

PATENT NO. : 5,687,059
DATED : November 11, 1997
INVENTOR(S) : John Hoppal

It is certified that error appears in the above-identified patent and that said Letters Patent is hereby corrected as shown below:

Column 5, line 66, "*protruding*" should read -- *substantially permanent* --;

Column 6, line 7, "*protruding*" should read -- *substantially permanent* --;

Column 6, line 8-9, delete " *,said at least one storage device bracket bottom does not completely fill said electronic chassis*" should read -- *such that siad at least one storage device bracket bottom is held in place relative to one plane of travel by said at least one substantially permanent protruding detail*--;

Column 6, line 13-15, delete "*,said at least one storage device bracket cover does not completely fill said electronic chassis*";

Column 6, line 18, delete "*upward*";

Column 6, line 18, after "*movement*" insert -- *in a direction substantially perpendicular to said one plane* --;

Column 7, line 11, "*mug*" should read -- *snug* --.

Signed and Sealed this

Eighth Day of May, 2001

*Attest:*

NICHOLAS P. GODICI

*Attesting Officer*  Acting Director of the United States Patent and Trademark Office